Dec. 26, 1944.    W. R. KETCHUM    2,365,883
APPARATUS FOR EXTRACTING AND REFINING CITRUS FRUIT JUICES
Filed June 13, 1940    3 Sheets-Sheet 1
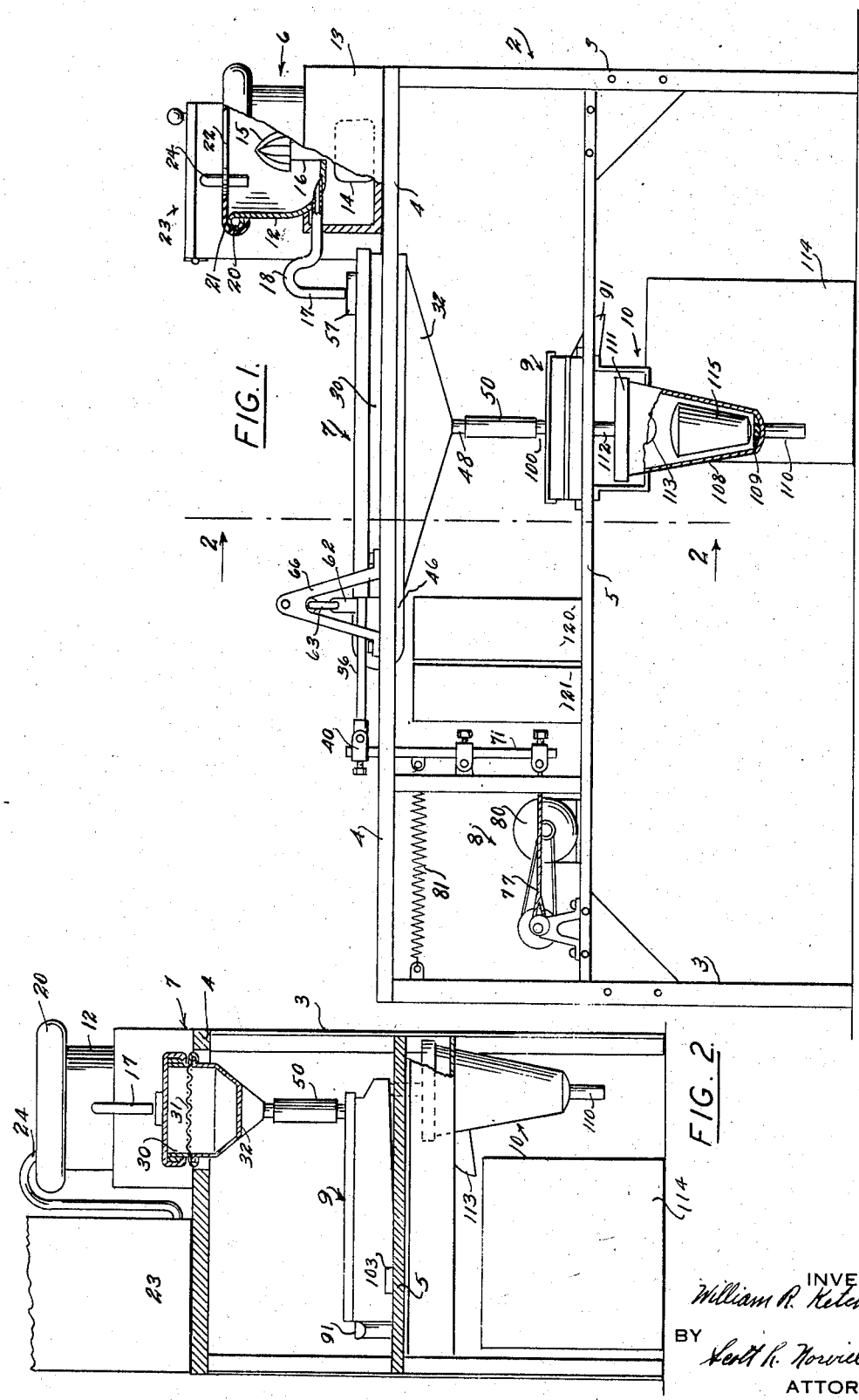

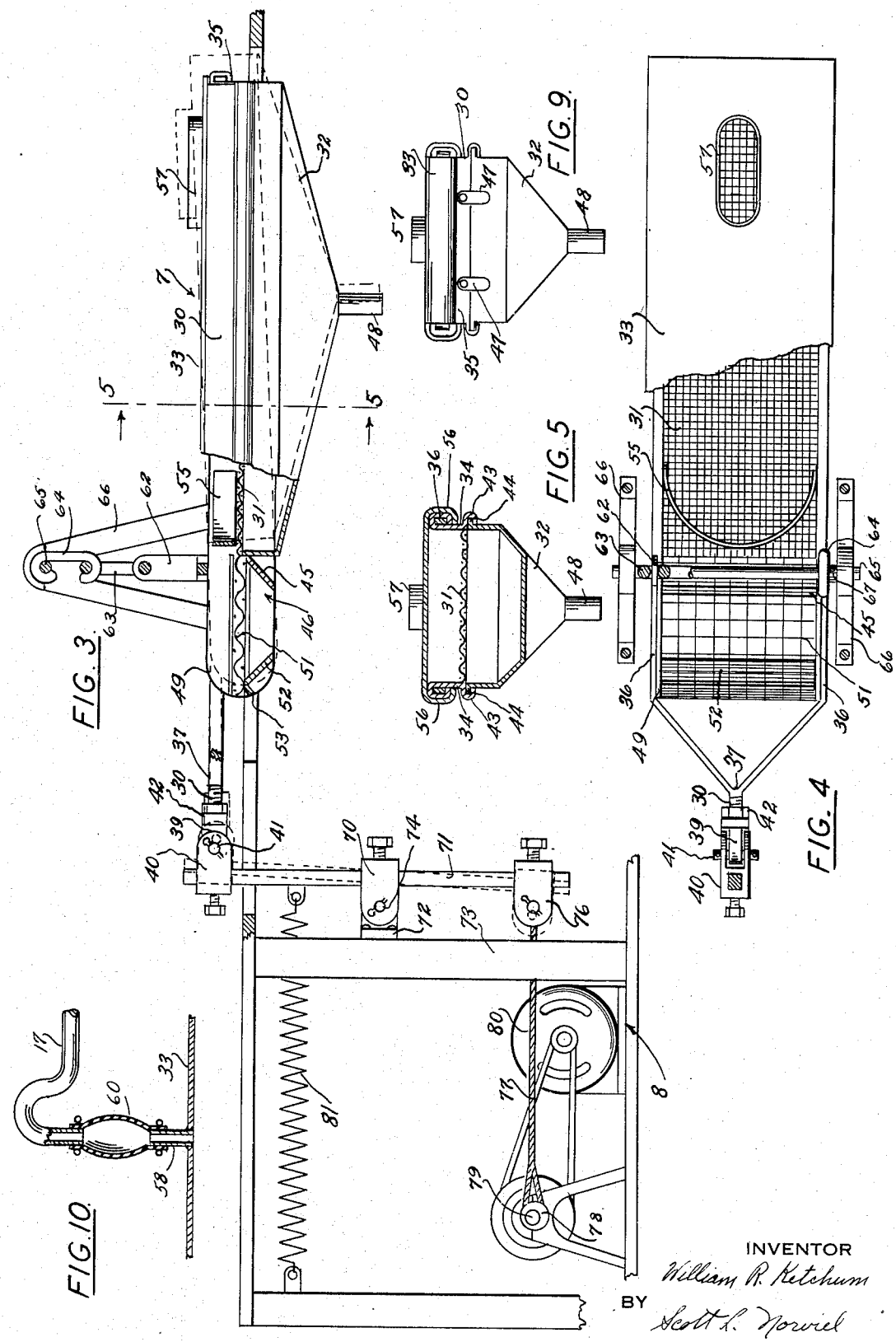

Dec. 26, 1944. W. R. KETCHUM 2,365,883
APPARATUS FOR EXTRACTING AND REFINING CITRUS FRUIT JUICES
Filed June 13, 1940 3 Sheets-Sheet 3
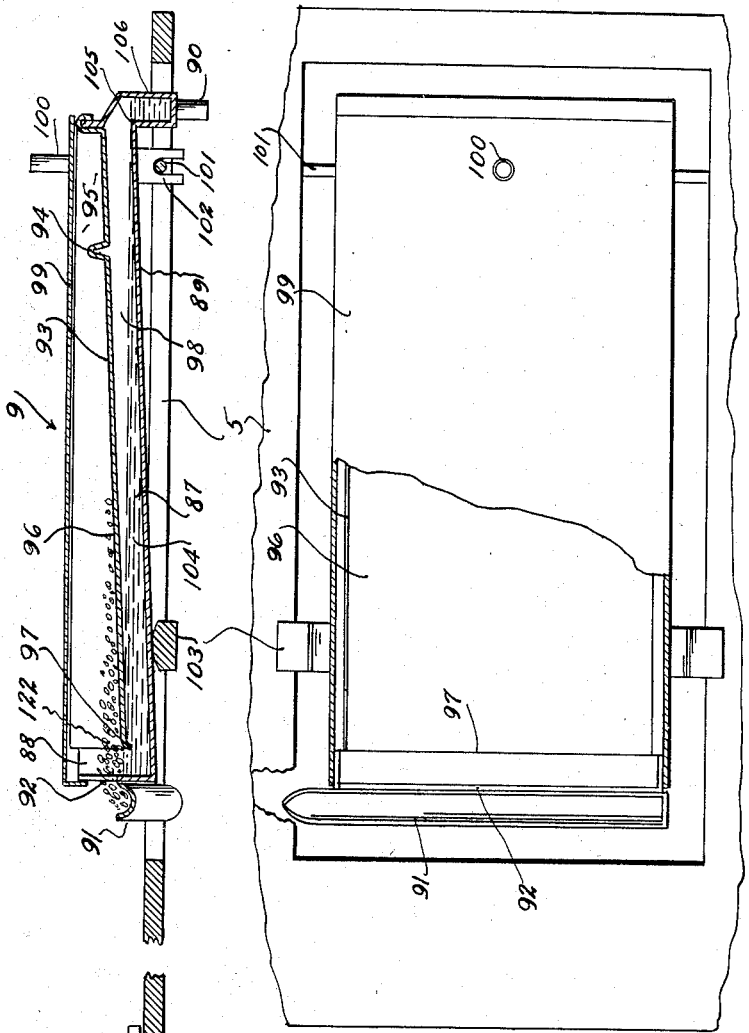
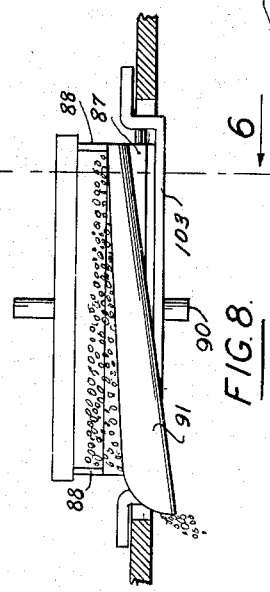
INVENTOR.
William R. Ketchum
BY Scott L. Norvied
ATTORNEY Patented Dec. 26, 1944

2,365,883

UNITED STATES PATENT OFFICE 2,365,883

APPARATUS FOR EXTRACTING AND REFINING CITRUS FRUIT JUICES

William R. Ketchum, Phoenix, Ariz.

Application June 13, 1940, Serial No. 340,344

3 Claims. (Cl. 210—53)

My invention relates to apparatus and devices for purifying and preserving citrus fruit juices and juices from similar fruits, and has for its objects, First, to provide mechanism for removal of juice from fruit together with such portions of the juice bearing pulp cells as are necessary to secure all juice, for then rapidly separating the juice from the pulp, screening the pulp, and subjecting the juice cells to a vibratory scrubbing action, following this with a removal of oil bearing froth and entrapment of predetermined quantities of juice and intermittent release thereof; all being performed with a minimum contact with air;

Second, to provide apparatus for rapid screening of pulp bearing juice, after it is burred from fruit, by a vibratory scrubbing action, together with devices connected therewith for removal of oil bearing froth from the screened juice and entrapment of predetermined quantities thereof out of contact with air, with intermittent removal thereof at predetermined intervals so that vacuum may be maintained on the juice so removed;

Third, to provide apparatus for vibratory scrubbing of the pulp from the juice and thereafter immediately separating the pulp from the seeds while still moist.

Fourth, to provide apparatus for burring juice in the presence of carbon dioxide gas and adapted to include this gas in the juice flow channel to exclude air from contact with the juice.

Other objects will appear hereinafter.

I attain the foregoing objects by means of the apparatus and devices disclosed in the accompanying drawings, in which—

Figure 1 is a front elevational view of the entire device;

Figure 2 is a sectional view thereof taken substantially on line 2—2, Figure 1;

Figure 3 is a front elevational view of the screening and scrubbing mechanism drawn on a somewhat enlarged scale;

Figure 4 is a plan view thereof, certain portions being broken away to show the interior construction;

Figure 5 is a sectional view taken substantially on line 5—5, Figure 3;

Figure 6 is a sectional side elevational view of the deoliumizer;

Figure 7, a plan view thereof;

Figure 8, an end elevation thereof;

Figure 9 is a right hand end view of the shaker device; and

Figure 10 is a fragmentary elevational sectional view of a modified form of a flexible connection between the juice extractor and the scrubber screener.

Referring to Figure 1, the general assembly includes a supporting bench and frame 2 having legs 3, a top 4 and a sub-frame 5. On top of this a juice extractor 6 of the hull burring type is positioned on the right end. To the left of this, a scrubber screener 7 is suspended within an opening in frame top 4. Further to the left and supported on sub-frame 5 is screen operating mechanism 8. Below the screener and supported on sub-frame 5 is a primary froth skimmer 9, and below this a secondary skimmer and juice float control 10 is supported from the sub-frame. All these principal parts cooperate to effect extraction of juice from fruit and a refining of this juice to make it suitable for preserving. The apparatus may also be considered as a refining device independent of the juice extractor and as such would include the scrubber screener, the primary juice skimmer and secondary skimmer and juice float control.

As here illustrated, the extractor 16 consists of a bowl 12 made of material resistant to corrosive elements in citrus juices. This is mounted on a box support 13 which contains a burr driving electric motor 14 having its shaft extending vertically through the bottom of the bowl and supporting and driving burr 15 at its upper end. The motor shaft extends through a collar tube 16, extending from the bottom of the bowl to the bottom of the burr to keep juice from following down the shaft. A spout 17 extends from the bottom of the bowl, is provided with a goose neck trap 18 and ends in a position to deliver juice to the right end of the screener 7, through an opening 57 in its top.

The top rim 20 of the bowl is covered with an elastic rubber diaphragm 21 which is retained by a tight fit around the rim edge and is provided with an opening 22 sufficient to permit the insertion of fruit portions to be burred and the subsequent removal of the hull.

A device for furnishing carbon dioxide gas to the burring bowl is shown generally at 23. This consists of an insulated box of either wood or metal having a removable cover to allow the insertion of carbon dioxide snow (dry ice) and a spout 24 directed into the interior of the bowl. As the carbon dioxide snow sublimes a continuous flow of the gas is admitted into the bowl. This is to be sufficient in quantity to crowd out the air in the bowl so that the fruit is burred in an atmosphere of this gas. As the burr spins this gas is thrown to the sides of the bowl but retained and returned toward the center by the edges of the bowl cover 21. The quantity of gas supplied is determined by the quantity of dry ice introduced in the box 24 and the insulating qualities of its walls. Obviously any other suitable means of supplying a steady regulated flow of this gas may be used. Where juice is prepared for immediate consumption, or is not to be stored for any considerable length of time this gas is not used.

The scrubber screener 7 is fabricated mainly of sheet material resistant to corrosive elements of fruit juices. I prefer to use sheet stainless steel or Monel metal.

In order to facilitate cleaning the body of the device is made of three principal parts, i. e. the upper part or tray 30 having a screen bottom 31, the funnel portion 32, and a cover 33.

The tray 30 is made rectangular in shape, having vertically extending sides 34 and a back 35, the edges of which are folded over and clinched around a rectangular supporting frame 36. This frame extends outward from the open end opposite back 35 and its side bars are brought together forming a Y 37 to which a rod 38 is welded. The outer end of this rod is threaded to receive the bearing head 39 which fits into clevis 40 supported on the cross pin 41. Rod 38 is made adjustable on the bearing head by reason of this threaded means of attachment and is locked in position by lock nut 42.

The lower side edges of tray 30 are folded and creased to form guides 43 to receive flanges 44, formed on the side edges of funnel portion 32. These two parts are fastened together by sliding these flanges into the guides right to left, as viewed in Figure 3, and until the funnel portion abuts against cross member 45 of pulp hopper 46. The parts are then locked in place by swinging tabs 47 on the right end of the tray. A spout 48 is attached to the lower portion of the funnel portion and is adapted to receive a flexible rubber tube 50 connecting with the primary skimmer. An arcuate baffle 55 is positioned on screen 31, near the left end of tray 30. Its ends are attached to the sides 34 of the tray body, and its mid portion is curved toward the left or outlet end of the tray.

The sides of the tray are extended at the discharge or juice end at 49 to form sides for the pulp hopper and a frame to support the coarse pulp screen 51 cross members 45, and 52 between these side portions form a hopper to direct the screened pulp while the member 52 has a front portion 53 bent downward and outward to form a directive baffle for seeds and large pieces of rind pulp and stems screened from the juice cell pulp. An arcuate baffle 55 is positioned on screen 51 and attached to the sides of the tray at the left or outer end of this part.

The cover 33 is provided with channels 56 along its sides to tightly fit over the rolled side edges of the tray. It is held in place by a tight frictional fit. This cover extends over screen 31 forming a comparatively tight cover except for the left or output end. As shown in Figures 3 and 9, the cover is provided with a rimmed opening 57 to receive juice from spout 17. This is ordinarily satisfactory, but where carbon dioxide gas is used in burring a closed connection as shown in Figure 10 is preferred. In this form the nipple 58 on cover 33 is connected to the mouth of spout 17 by flexible rubber bulbed tube 60.

The screener is suspended from two upwardly extending lugs 62 to which are attached open or C links 63 and 64. The upper link 64 hooks over a transverse supporting bar 65 extending between standards 66. This bar may be covered with a rubber sleeve to minimize vibratory noise or made of hard fiber for the same purpose. Sleeves 67 at each end hold the top links in position. Suspension is made in this manner to give the whole screener a free swinging motion as indicated by the dotted outline Figure 3. Use of the C links permits easy removal for cleaning.

Shaking movement is imparted to the screener (and a means of support as well), by clevis 70 mounted near the center of shaker bar 71. This bar is supported on a bearing 72 supported on a vertical frame member 73, having a cross pin 74 which couples it with a clevis 75. At the lower end of the shaker bar a third clevis 76 attaches to one end of cord 77, the opposite end of which is provided with a loop which rides in an annular groove in an eccentrically mounted pulley 78 on shaft 79. This shaft is turned at approximately 700 revolutions per minute by means of pulleys and belt from electric motor 80. A spring 81 normally keeps cord 77 taut and holds shaker bar 71 as far to the left as the position of the cord on the eccentric will permit. All of the clevis connections are held in place on the shaker bar by set screws so as to make their positions adjustable and permit various degrees of movement to be imparted to the shaker. The movement imparted to the shaker by this suspension is generally indicated by the dotted outline, Figure 3. The receiving (right hand) end has more amplitude of movement than the left. This movement combines an upward and downward smaller component with a greater right and left longitudinal component. The former keeps the fruit cell pulp from packing on the screen and the latter jigs the screened pulp to the left since the throw of shaker bar 71 is sharper left to right than right to left due to the whip or snap of the cord 77. The pulp may be said to walk on the screen from right to left, and as it does this the juice bearing cells are given a chaffing or scrubbing action which effects a removal of juice contained in or adhering to them. I have found that the burr often removes fruit cells almost intact and without fully crushing the juice from them. This definite vibratory scrubbing action, therefore, is necessary to an efficient removal of all juice from this fruit cell pulp. Baffle 55 dams up the pulp as it walks along the screen 49 and prevents a too rapid removal of this pulp.

Screened juice drops from the spout 48, through a flexible connecting tube 50 to the primary skimmer 9. This consists of a bottom tray 87 having sides 88 extending upwardly from a slanting bottom 89. At the right hand or discharge end (as viewed in Figure 6) a trough 106 connects with a discharge tube 90. At the left end a trough 91 is attached on the outside with one edge adjoining the lip of a froth skimming weir 92. A juice spreader 93 is removably fitted within this bottom tray and has a cross baffle or spreader weir 94 just below the receiving area 95. This dams up the received juice and spreads it evenly over the apron portion 96. The bottom of this spreader is substantially parallel with that of the tray bottom 89. The apron terminates at a lip 97 short of the end of tray 87 and forms a trap through which juice may flow into the lower leveling compartment 98 below the spreader. A lid 99 covers the entire top of the tray and is provided with a juice receiving tube 100 which is connected to the lower end of flexible tube 50.

This skimmer is supported at its right hand end on a rod 101 extending across a rectangular opening on sub-frame 5. This rod is engaged by downwardly extending notched legs 102 so that the skimmer has rigid lateral horizontal support but is pivoted to adjust its longitudinal horizontal position. This adjustment is accomplished by the cross stirrup 103, the ends of which are supported on the sides of the opening in the sub-frame and the middle portion of which engages the slanting bottom 89 of the skimmer tray, by sliding this stirrup support longitudinally of the skimmer body the level of juice 104 in the lower compartment may be changed with reference to the spillover 105 adjoining trough 106. Thus the depth of juice in the lower compartment with reference to the froth weir 92 may be definitely gauged. Froth is discharged over this weir into trough 91.

The secondary froth skimmer and juice float control consists of a funnel shaped body portion 108 having a closed bottom provided with a soft rubber valve seat 109. This and the bottom are centrally pierced and communicate with a discharge nipple 110. The top of this body is closed by a cover 111 having a nipple to receive a rubber connecting tube 112 from the discharge tube of the primary skimmer. About one-fourth of the distance from top to bottom a spout 113 is tapped from the body, and led out sufficiently to discharge froth into the same receiving vessel 114 as that receiving froth from trough 106 on the primary skimmer. A float 115, positioned within the funnel shaped body portion, is shaped to move freely up and down therein, and has sufficient air capacity counterbalanced by weights in the bottom so that it remains closed on the valve seat 109 until fluid juice within the body raises almost to the level of the spout 113. The convex bottom of the float forms an effective valve to close the discharge through nipple 110 when resting on valve seat 109. When sufficient liquid accumulates in the body the float raises and releases the juice through this discharge. The inertia of the float in this juice is such that nearly the whole amount of the juice is discharged before it drops to closed position. It is to be understood that discharge nipple 110 is connected to a juice delivery pipe through which the juice is drawn by vacuum pressure.

In use, the juice is burred out of citrus fruit halves in the usual manner, except that preferably burring is done in the atmosphere of carbon dioxide introduced through tube 24 into bowl 12. In the burring process a great amount of the pulp or skin of juice bearing cells is burred from the fruit and mixed with the juice. In addition to this, seeds and pieces of rind and stem pulp are included. All these pass through the spout 17 into the screener scrubber 7.

Primarily, the operation of the screener is to remove the large pieces of pulp and seeds. In addition to this, however, screen 31 is made small enough (about 40 mesh) so that only the smaller particles of juice cell pulp may go through. Any juice cells not fully macerated in the burring device are chaffed and scrubbed until all usable juice is extracted. As the pulp walks from right to left over the screen, it accumulates against the baffle 55 and is retained long enough for screening of any remaining juice. Due to the particularly vibratory action of the screen this pulp climbs over the baffle and then moves over the large screen 51. This permits the smaller particles of fruit cell pulp to be deposited through hopper 46 into a receiving vessel 120 positioned on sub-frame 5. The seeds and large pieces of stem and pulp pass over this screen and are deposited in a receiving vessel 121, similarly positioned.

In the meantime, the juice has passed into the primary skimmer 9. From the receiving compartment 95 the juice is spread by weir 94 and I have found that where it is allowed to flow over the apron 93 when thus spread out, a foam or froth will rise to the surface and carry with it a principal part of the rind oil, which is always present in juice removed from fruit by burring. I have also found that this rind oil is one of the principal causes of juice going stale and acquiring an unpleasant stale taste. While I do not know the exact chemical reaction that takes place, it is, nevertheless, apparent that by the removal of this oil juice remains in a fresh and palatable state for a longer period than otherwise. Froth forms on juice freshly extracted due to the release of air or other gases and the bubbles forming the froth bring up with them to the surface the oil which films on their surfaces. In order to secure a rapid and complete frothing it is necessary to spread the juice out in a thin film, as above explained. Froth may then be skimmed off as it accumulates and as indicated at 122. The flow of the juice over the apron pushes it out over weir 92 and into froth 91, whereas the return flow of the juice over lip 97 separates it from the body of the froth. While most of this froth and its included oil is removed in the skimmer 9, there is also a small amount which forms on top of the juice as it accumulates in the juice float control and secondary skimmer 10.

Therefore, I have found it expedient to provide the froth overflow spout 113. Both spouts 91 and 113 empty into a vessel 114.

Since the level of juice in the body 108 of the juice float control is constantly changing the froth works up and down its sides and accumulates at the top. This is forced out by the intermittent action of the juice level and of the float 115. The action of the float in intermittently opening and closing the vent into nipple 110 has been previously explained. However, for the purposes of understanding this flow, it is now explained that a vacuum is maintained on a juice delivery tube attached to nipple 110. When no juice is present in the body 108, the float 115 rests on the seat 109 and closes the centrally positioned hole piercing it. The rounded bottom of the float constitutes the closing valve and this is kept closed both by the weight of the float and by the suction of the vacuum. As juice is intermittently introduced into this body—since in burring fruit a constant flow of juice is impossible—juice from time to time accumulates until it approaches the level of spout 113. At this point the buoyancy of the float is sufficient to break the vacuum seal and raise the float off of the seat 109. Juice then flows out of the body 108 until the float drops again to a position on this seat.

While I have described only one exemplary form of my invention and explained its use, I realize that to those familiar with the art numerous variations will be suggested, all of which, however, may well remain within the spirit of the invention. Therefore, I wish to be limited only by the following claims:

1. In apparatus for refining citrus fruit juices, a froth skimmer including, in combination, a rectangular closed case having an upper body compartment and a lower juice levelling compartment separated by an apron, a cover fitting over the top of said upper portion provided with a tube leading to a receiving compartment and adapted to receive juice to be skimmed, a spreader weir extending along one side of said juice receiving compartment adapted to spread juice received in a thin flow over said apron; an apron extending downwardly from said weir at a slight slant from the horizontal longitudinally of the skimmer body terminating with a lip, a trap formed at the lower edge of said apron between the lip thereof and the end of said case body communicating with said juice levelling compartment in the lower portion of said skimmer body, a froth skimming weir adjacent said lower lip of said apron, substantially on a level with said lip, said levelling compartment within said case body being below said apron, extending from said trap to a juice collecting trough along the edge of said case substantially below the said receiving compartment and provided with a juice delivery tube, and means for supporting said case body so that it is maintained horizontal laterally but may be varied from the horizontal longitudinally so that the juice level in the lower compartment may be varied relative to said froth skimming weir including a horizontal supporting frame plate, having a rectangular opening adapted to receive the body of the skimmer, a rod transversely extending across said opening and pivotally attached to said skimmer body at its juice receiving end, and a sliding stirrup extending transversely of said opening with its ends supported on the edges thereof and its mid portion adapted to support the said body by contact with the underside of its slanting bottom.

2. A juice skimmer for the purposes as herein described, including, in combination, a rectangular tray having a slanting bottom, upwardly extending sides and ends, the lower end closure formed into a froth skimming weir, and the upper end closure shaped to include a transverse trough below the bottom level at said upper end; a juice spreader removably fitted within said tray consisting of a plate with its bottom area substantially parallel to the bottom of said tray to provide a slant from a juice receiving area at its upper end to a lip at its lower end, a transverse rib extending thereacross near the upper end forming a spreader weir below the juice receiving area, and a slanting apron therebelow terminating with said lower lip short of the lower end closure of said tray forming a juice receiving trap leading into the compartment formed below said juice spreader; a slanting trough attached to the outside of said froth skimming weir; a covering lid for said tray having a juice delivery tube positioned above said juice receiving area on said juice spreader; supporting means for said tray to provide longitudinal leveling including notched legs depending from its upper end resting on a transverse rod, and a laterally slidable stirrup contacting variable positions along its slanting bottom, said rod and said stirrup being supported in a frame surrounding said tray.

3. In citrus juice refining apparatus, a froth skimmer having a body portion including an upper chamber having a receiving compartment at one end and a froth skimming compartment at the other end, a juice spreading weir at the lower part of said receiving compartment dividing it from the lower portion of said chamber, and being adjacent to a downwardly slanting juice spreading apron extending therebeyond, and terminating in a lip; a froth skimming weir positioned opposite and substantially on a level with said lip on said apron; a trap formed between said apron lip and said froth skimming weir leading into a lower chamber formed in said body below said apron; and a froth collecting trough extending along and below the said froth skimming weir on the outside portion of said body; a juice delivery tube positioned to deliver juice to said receiving compartment; and supporting means for the body of said chambers, including a transverse rod positioned below said receiving compartment, means for pivotally mounting said body thereon, and a sliding stirrup horizontally supported and contacting an angular portion of said froth skimmer body, whereby longitudinal movement thereof will vary the longitudinal horizontal plane of said deoliumizer body.

WILLIAM R. KETCHUM.